United States Patent [19]

DeJager

[11] Patent Number: 5,274,503
[45] Date of Patent: * Dec. 28, 1993

[54] HIGH APERTURE FINITE CONJUGATE LENS SYSTEM SUITABLE FOR USE AS A MICRO RELAY LENS

[75] Inventor: Donald DeJager, Rochester, N.Y.

[73] Assignee: Eastman Kodak Company, Rochester, N.Y.

[*] Notice: The portion of the term of this patent subsequent to Dec. 21, 2010 has been disclaimed.

[21] Appl. No.: 749,396

[22] Filed: Aug. 23, 1991

[51] Int. Cl.$^5$ .......................... G02B 21/02; G02B 9/00
[52] U.S. Cl. .................................... 359/657; 359/658; 359/740
[58] Field of Search ............... 359/656, 657, 658, 739, 359/740

[56] References Cited

U.S. PATENT DOCUMENTS

| | | | |
|---|---|---|---|
| 4,080,048 | 3/1978 | Kimura | 350/214 |
| 4,130,350 | 12/1978 | Koizumi | 350/216 |
| 4,206,974 | 6/1980 | Maeda | 350/215 |
| 4,251,131 | 2/1981 | Tojo | 350/414 |
| 4,349,249 | 9/1982 | Brixner et al. | 350/483 |
| 4,364,644 | 12/1982 | Ikemori | 350/464 |
| 4,368,957 | 11/1983 | Chirra | 350/469 |
| 4,505,553 | 3/1985 | Asoma | 350/414 |
| 4,514,049 | 4/1985 | Hirano | 359/679 |
| 4,521,086 | 6/1985 | Kurita | 350/464 |
| 4,537,472 | 8/1985 | Asoma | 350/414 |
| 4,563,060 | 1/1986 | Yamagishi | 350/414 |
| 4,591,243 | 5/1986 | Yamagishi | 350/414 |
| 4,702,569 | 10/1987 | Mercado et al. | 350/479 |
| 4,704,011 | 11/1987 | Mercado | 350/467 |
| 4,753,522 | 6/1988 | Nishina et al. | 359/775 |
| 4,767,199 | 8/1988 | Yamamoto et al. | 350/412 |
| 4,955,701 | 9/1990 | Kataoka et al. | 359/795 |
| 5,039,212 | 8/1991 | Kanoshima | 359/679 |

FOREIGN PATENT DOCUMENTS

| | | |
|---|---|---|
| 0276865 | 8/1988 | European Pat. Off. . |
| 0340647 | 11/1989 | European Pat. Off. . |
| 0416651 | 3/1991 | European Pat. Off. . |
| 2101785 | 8/1972 | Fed. Rep. of Germany . |
| 3120276 | 8/1982 | Fed. Rep. of Germany . |
| 2183865 | 6/1987 | United Kingdom . |

Primary Examiner—Scott J. Sugarman
Attorney, Agent, or Firm—Svetlana Z. Short

[57] ABSTRACT

A high aperture finite conjugate lens suitable for use in applications requiring high numerical aperture on both object and image sides of the lens such as laser thermal printer system.

20 Claims, 2 Drawing Sheets

HIGH APERTURE FINITE CONJUGATE LENS SYSTEM SUITABLE FOR USE AS A MICRO RELAY LENS

RELATED APPLICATIONS

The present application is related to the following commonly assigned issued U.S. patents and co-pending applications: U.S. Pat. No. 5,146,242, issued Sep. 8, 1992, entitled WRITING BEAM ANGULAR ALIGNMENT DEVICE; U.S. Pat. No. 5,146,241, issued Sep. 8, 1992, entitled AUTOMATIC CUT-OUT FOR AUTO-FOCUS DEVICE; U.S. Pat. No. 5,212,500, issued May 18, 1993, entitled WRITING BEAM FOCUSING UTILIZING LIGHT OF A DIFFERENT WAVELENGTH; U.S. Pat. No. 5,196,866, issued Mar. 23, 1993, entitled FOCUS FIBER MOUNT; and U.S. Pat. No. 5,138,497, issued Aug. 11, 1992, entitled HIGH SPEED FOCUSING LENS ASSEMBLY; and U.S. Ser. No. 749,228, entitled LASER THERMAL PRINTER METHOD AND APPARATUS, in the names of Raymond J. Harshbarger, William G. Fahey, Ronald R. Firth, Seung-ho Baek, and Charles D. DeBoer; U.S. Ser. No. 749,229, entitled LASER THERMAL PRINTER USING ROLL MATERIAL SUPPLY, in the names of Frederick B. Fox, Michael H. Parsons and James L. Mohnkern; U.S. Ser. No. 749,378, entitled SELECTIVELY WOUND MATERIAL FOR A LASER THERMAL PRINTER, in the name of Michael H. Parsons; U.S. Ser. No. 749,223, entitled MATERIAL SUPPLY CAROUSEL, in the names of James L. Mohnkern, Michael H. Parsons, and Rene L. Gobeyn; U.S. Ser. No. 749,050, entitled MATERIAL TRANSPORT UTILIZING A MOVABLE EDGE GUIDE, in the name of Michael H. Parsons; U.S. Ser. No. 749,372, entitled LASER THERMAL PRINTER WITH A VERTICAL MATERIAL TRANSPORT, in the name of Michael H. Parsons; U.S. Ser. No. 749,224, entitled MATERIAL TRANSPORT THAT SELECTIVELY CONTACTS DIFFERENT MATERIALS, in the names of Michael H. Parsons and William J. Simmons; U.S. Ser. No. 749,399, entitled MULTI-CHAMBERED IMAGING DRUM, in the name of Roger S. Kerr; U.S. Ser. No. 749,232, entitled METHOD AND APPARATUS FOR SELECTIVELY SORTING IMAGE-BEARING SHEETS FROM SCRAP SHEETS, in the names of Bradley C. DeCook, Roger S. Kerr and Richard L. O'Toole; U.S. Ser. No. 749,391, entitled VACUUM IMAGING DRUM WITH A MATERIAL RECEIVING RECESS IN THE PERIPHERY THEREOF, in the name of Roger S. Kerr; U.S. Ser. No. 749,231, entitled METHOD OF REMOVING AIR FROM BETWEEN SUPERPOSED SHEETS, in the names of Bradley C. DeCook, Roger S. Kerr and Richard L. O'Toole; U.S. Ser. No. 749,389, entitled VACUUM IMAGING DRUM WITH AN AXIAL FLAT IN THE PERIPHERY THEREOF, in the name of Roger S. Kerr; U.S. Ser. No. 749,230, entitled METHOD AND APPARATUS FOR LOADING AND UNLOADING SUPERPOSED SHEETS ON A VACUUM DRUM, in the names of Roger S. Kerr and James K. Lucey; U.S. Ser. No. 749,227, entitled LASER THERMAL PRINTER WITH POSITIVE AIR FLOW, in the names of Roger S. Kerr and Douglass L. Blanding; U.S. Ser. No. 749,226, entitled AUTO-FOCUS DETECTOR MASK, in the name of Michael S. Ferschl; U.S. Ser. No. 749,225, entitled INITIAL SET-UP PROCEDURE FOR AN AUTO-FOCUS LENS, in the name of Michael S. Ferschl; U.S. Ser. No. 749,222, entitled FOCUSING LASER DIODE MOUNT ON A WRITE HEAD, in the names of Michael S. Ferschl and Erich Zielinski; U.S. Ser. No. 749,386, entitled OPTICAL FIBER MOUNT AND SUPPORT, in the names of Roger S. Kerr and Stanley J. Thomas; U.S. Ser. No. 749,387, entitled REGISTRATION INDICIA ON A DRUM PERIPHERY, in the names of Cheryl J. Kuberka, David F. Dalfonso and Ensley E. Townsend; U.S. Ser. No. 749,382, entitled PRECISION LEAD SCREW DRIVE ASSEMBLY, in the name of Erich Zielinski; U.S. Ser. No. 749,390, entitled OPTICAL FIBER TAKE-UP ASSEMBLY, in the name of Erich Zielinski; U.S. Ser. No. 749,383, entitled WRITING TRANSLATOR MOUNT, in the name of Erich Zielinski; and U.S. Ser. No. 749,394, entitled A THERMAL PRINTER SYSTEM WITH A HIGH APERTURE MICRO RELAY LENS SYSTEM, in the names of Donald DeJager and Seung Ho Baek, all filed Aug. 23, 1991.

1. Technical Field

This invention relates generally to finite conjugate lens systems and more particularly to a well corrected finite conjugate micro relay lens system having high numerical apertures on both object and image sides.

2. Background Art

This invention is designed for use in projecting a fiber optic-laser diode linear array onto a thermally sensitive medium in a thermal printer. However, it has general application to systems requiring high numerical aperture on both object and image side while working at finite conjugates.

Commercially available high aperture systems such as microscope objectives and Petzval-type lenses are generally designed for an object location which is far from the lens system when compared to the location of the image. Typical magnification provided by a microscope objective is 40:1 and while the f-number of the lens system is low on the image side, it is high on the object side. For a laser thermal printer, a micro relay lens system requires a very low f-number and thus extremely high numerical apertures on both object and image side of the lens system. No such lenses are known to exist.

SUMMARY OF THE INVENTION

The object of this invention is to provide a high speed, well corrected, finite conjugate imaging lens system, with unusually high numerical apertures and correspondingly very low f-numbers on both image and object side of the lens system.

Accordingly, the present invention provides a finite conjugate lens system having high numerical apertures on both object and image sides, the lens system comprising an aperture stop located approximately at the center of the high aperture lens system and a plurality of the lens elements centered on an optical axis and arranged into two lens groups of positive power to provide the high numerical apertures on both the object and the image sides of the lens system. The two lens groups are located on each side of the aperture stop and each lens group comprises an outer-most lens element and an inner-most lens element. The inner lens elements are located in close proximity to the aperture stop and each of the inner-most lens elements have a convex surface facing towards the aperture stop.

BEST MODE FOR CARRYING OUT THE INVENTION

The lens system of the present invention has a general application to systems requiring high numerical aperture on both object and image side while working at finite conjugates. An example of one such application is the use of the lens system in a new thermal printer system, an example of which is described below.

In the graphic arts industry, digital scanning printers are widely used for making color separation negatives. After the negatives are made, a color proof image is created, and is approved or rejected. This process may be repeated one or more times before approval is obtained from the customer. An alternate procedure, which uses the lens systems described herein, is to make the color proof image directly, bypassing the making of color separation negatives. Negatives may be made only after the color proof has been approved. This alternate procedure is less costly and is less time consuming than is the procedure that is presently in wide usage.

The images that are presently created by digital scanning printers require from 1000 to 3000 dots per inch. The image sizes typically range from A4 (8"×10") to A2 (18"×24"). The size of the image and the large amount of digital image data requires a laser scanning system which is quite expensive, using precision optical components and high bandwidth electronics. The system utilizing the lenses of our present invention is simpler, less expensive and produces results faster.

Figure 2:
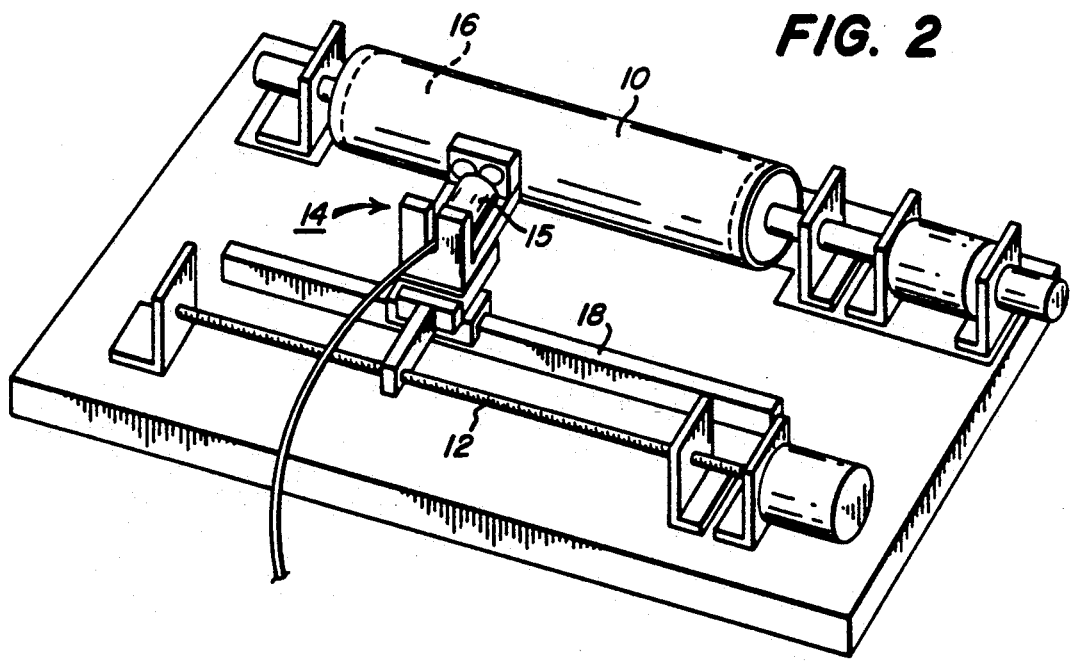
FIG. 2 is a schematic of a laser diode thermal printing system.
Figure 3:
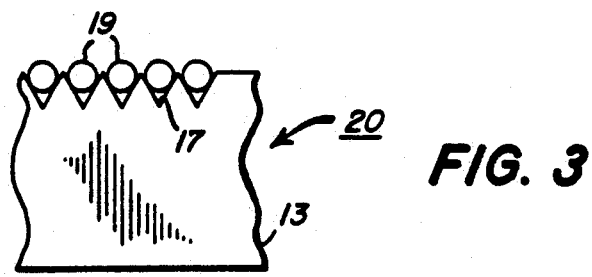
FIG. 3 is a schematic of a multi-fiber array printing head.

Referring to FIGS. 2 and 3, the printer system utilizing the lens systems of our present invention comprises a rotating drum 10, a printhead 14 and a leadscrew 12. A receiver material 16 is wrapped around the drum 10. A sheet of thermal sensitive media-containing colored dye is placed over the receiver material. The printhead 14 comprises a relay imaging lens system 15, and a linear array 20 of optical fiber ends, which are secured in position by a silicon wafer 13 (see FIG. 3) which is etched to have a series of adjacent V-grooves 17. The fibers 19 are made to lie in these grooves 17 in such a way that the ends of the fibers lie in a common plane.

The center-to-center spacing between the fibers is typically 0.15 mm. There may be up to 20 such fibers in the array, so that the length of the array may be almost 3 mm. The fiber arrays are further described in U.S. Pat. Nos. 4,389,655 and 4,911,526. The energy that is emitted by this array of fiber ends is picked up by the relay lens 15 and is focused on the thermal sensitive media 16 on the drum 10, forming an array of very small heated spots. The thermal sensitive media 16 releases the dye, which is then transferred to the paper underneath. The printhead is carried along on a rail 18 by the leadscrew 12 in synchronization with the drum rotation. As the drum rotates, the energy coming out of each fiber end varies in accordance with the signal which is sent to the laser diode which feeds that particular fiber. If there are 20 such fibers, there are 20 parallel scan lines created simultaneously on the media, as the drum 10 rotates.

The characteristics of the relay lens systems of the illustrated embodiments are as follows:

1. They are color corrected to perform well at wavelengths between 790 and 830 nanometers. The glasses that are used must be highly transparent at these wavelengths.

2. They are designed to work at finite conjugates, at a fixed magnification, generally between ⅓ and ½, so that the distance between the object and the image (called the total track length) is on the order of about 2 to 3 inches.

3. They have high numerical apertures, on both object and image sides, such as are associated with microscope objectives. The numerical aperture on the object side of the lens should be large enough to capture a large fraction of the energy leaving the fiber ends. Multimode fibers typically have numerical apertures of 0.3 to 0.4, and single mode fibers will typically have numerical apertures of 0.1 to 0.2. The relay lenses described herein have object-side numerical apertures of 0.2 to 0.253, which is large enough to capture most of the energy emitted by the fibers.

The numerical apertures on the object and image sides are related to the magnification MAG of the lens by the following equation:

MAG = (numerical aperture at object)/(numerical aperture at image)

For example, for embodiment #1, MAG = (0.25)/(0.5) = 0.5.

4. The image quality, or sharpness of the imagery, does not have to be as good as is normally associated with microscope objectives. The spots that are formed on the image plane are approximately about 0.02 to 0.04 mm in diameter, whereas in a microscope objective having a numerical aperture of say, 0.25, the visible light diameter of the Airy disc would be about 0.003 mm. Thus, these lenses do not have to be "diffraction limited". Also, the useful depth of focus of these lenses is several times larger than that suggested by the Rayleigh criterion. Another consideration is that these lenses can be fabricated with looser tolerances than those associated with normal microscope objectives.

Five illustrative embodiments for the lens systems are described in the following table:

| Embodiment number | 1 | 2 | 3 | 4 | 5 |
| --- | --- | --- | --- | --- | --- |
| Number of Elements | 7 | 8 | 8 | 9* | 9* |
| Object Diagonal | 3.6 mm | 3.6 mm | 2.4 mm | 3.6 mm | 3.0 mm |

-continued

| Embodiment number | 1 | 2 | 3 | 4 | 5 |
|---|---|---|---|---|---|
| Image Diagonal | 1.8 mm | 1.2 mm | 0.8 mm | 1.68 mm | 1.4 mm |
| Magnification | 0.5 | 0.3333 | 0.3333 | 0.46 | 0.46 |
| Object Numerical Aper. | 0.25 | 0.2 | 0.2 | 0.253 | 0.253 |
| Image Numerical Aper. | 0.50 | 0.6 | 0.6 | 0.55 | 0.55 |
| ANSI f-number of lens | 0.67 | 0.63 | 0.63 | 0.62 | 0.62 |
| Total Track Length | 50.8 mm | 50.8 mm | 50.8 mm | 70.7 mm | 58.5 mm |

*not including the beamsplitter prism used for autofocusing.

In illustrative embodiments 3, 4 and 5, the rear element L may move +/− 0.1 mm with respect to the rest of the lens. The focused image position also moves, in such a way that the distance from the rear surface of the rear element stays nearly constant, changing less than 0.01 mm. This feature in these embodiments is quite novel in a lens of this high aperture.

In illustrative embodiments 4 and 5, a beamsplitter prism B is added on the front or object side of the lens, permitting the use of a servo driven focusing rear lens element. In this system (not shown in the drawings), an infrared beam at wavelengths between 900 and 1,000 nanometers is introduced into the beamsplitter prism from the end of a fiber located near the multi-fiber array. The beam goes through the relay lens and is focused on the media. The beam has no heating effect on the media. After reflection at the media, the beam retraces itself backwards through the lens, and is reflected by the beamsplitting interface within the beamsplitter prism. This beam is then analyzed for focus. An electrical signal is generated, and used to drive the rear lens element into a new position so as to cause the heating beams to focus properly on the media.

Figure 1:
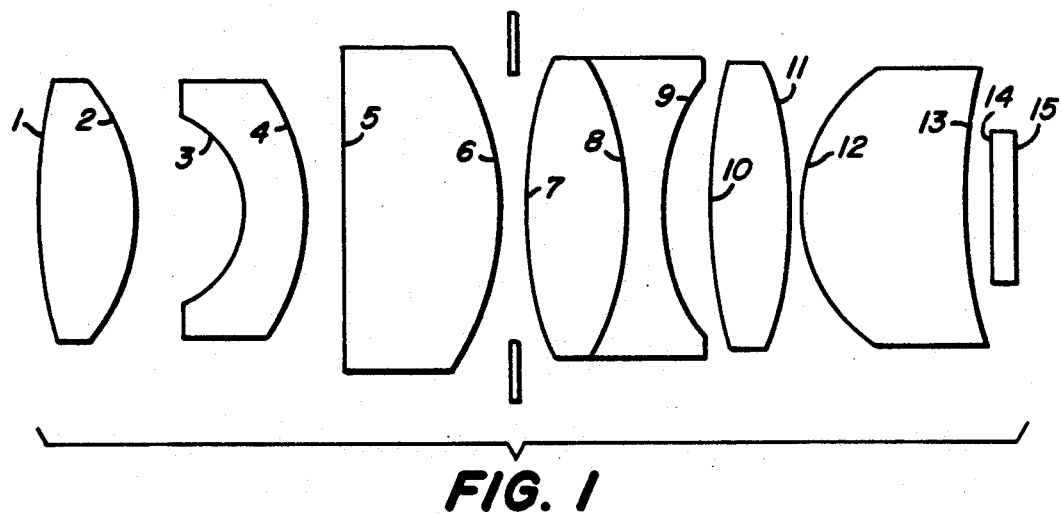
FIG. 1 is a profile drawing of an optical system of the first illustrative embodiment, whose design is optimized for numerical apertures of 0.25 and 0.5 for the object and image sides respectively.

The lens system 100 of the first embodiment of the present invention is illustrated in FIG. 1. It was designed for use in a laser diode thermal printing system (FIG. 2) using a multi-fiber array printing head (FIG. 3) coupled to high power laser diodes. The printer system uses a drum 10 for the line direction scan movement and a stepping motor or a linear translation stage for the page direction scan movement. A custom designed lens was necessary to meet the requirements for the numerical aperture and the field of view requirements. The numerical aperture of the beam on the object side of the lens system is 0.25, and the numerical aperture of the beam on the image side of the lens system is 0.5. The ANSI f-number of the lens system is 0.6667. The field angle is 3.08 degrees. Relative illumination due to cosine effects exceeds 1.0 at the edge of field of view. The distance from the object to image is 50.8 mm (2 inches). The lens system 100 is used in the rear infrared IR (630 to 810 nm) to relay an object having a diameter of 2.4 mm to an image of diameter 1.2 mm giving a magnification of ½. The lens system 100 is used to form an image of a source consisting of a linear array of fibers, each transmitting energy from remotely located infrared laser diodes. The combination of very high numerical aperture and sharp imagery over an extended field of view dictated the need for a new lens of a very unusual construction.

The lens system 100 comprises a plurality of lens elements and an aperture stop located approximately at the center of the lens system. Following from object to image, the lens elements are: a biconvex positive singlet L1, a meniscus negative singlet L2 with a concave surface S3 facing an object and a convex surface S4 towards an aperture stop ST, a plano-convex positive singlet L3 located near the aperture stop with its convex surface S6 facing the aperture stop, a meniscus doublet comprised of a bi-convex positive element L4 cemented to a bi-concave negative lens element L5, a bi-convex positive singlet L6 and a positive meniscus lens element L7. The numerical data for the optical system is as follows:

TABLE 1

| SURFACE | CLEAR APER. | RADIUS | THICKNESS | GLASS |
|---|---|---|---|---|
| S1 | 8.41 | 38.6019 | 3.670 | 517642 |
| S2 | 8.82 | −7.29740 | 4.100 | |
| S3 | 6.83 | −4.31940 | 2.360 | 785258 |
| S4 | 8.94 | −8.54580 | 1.400 | |
| S5 | 10.12 | PLANO | 6.290 | 651559 |
| S6 | 11.36 | −10.7207 | 0.500 | |
| | 10.55 | DIAPHRAGM | 0.500 | |
| S7 | 10.44 | 17.0410 | 3.800 | 651559 |
| S8 | 9.87 | −12.0819 | 1.500 | 785258 |
| S9 | 9.09 | 9.22950 | 1.810 | |
| S10 | 9.57 | 42.9968 | 3.020 | 651559 |
| S11 | 10.01 | −14.6843 | 0.500 | |
| S12 | 9.74 | 6.77130 | 6.400 | 750504 |
| S13 | 5.98 | 15.7111 | 1.000 | |
| S14 | 5.14 | PLANO | 1.000 | 517642 |
| S15 | 4.44 | PLANO | | |
| | | LENS LENGTH | 37.850 | |

The performance of the system is excellent. Sagital and tangential MTF's exceed 0.5 at 50 cycles/mm over the entire field of view, in a fixed flat focal plane and over the wavelength region from 800 to 820 nm. The lens system also has a low distortion. The focusing function is performed by moving an entire lens system.

Figure 4:
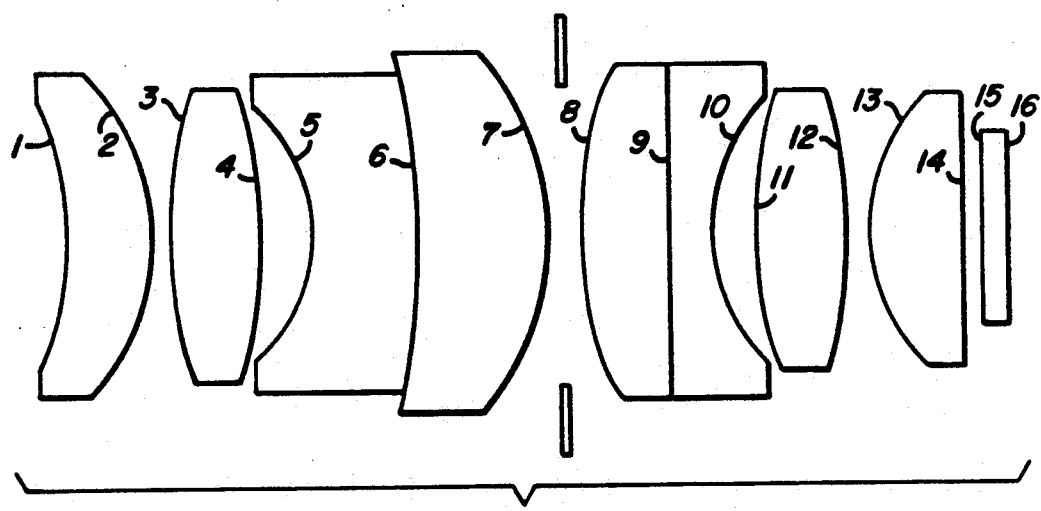
FIG. 4 is a profile drawing of an optical system of the second illustrative embodiment whose design is optimized for numerical apertures of 0.2 and 0.6.

The second embodiment of the present invention is illustrated in FIG. 4.

The optical system 200 of the second embodiment is illustrated in FIG. 4 and used to relay an object of a diameter 3.6 mm to an image of diameter 1.2 mm giving a magnification of ⅓. The numerical aperture of the optical system at the object side is 0.2. The numerical aperture of the optical system at the image side is 0.6. The ANSI f-number is 0.625. This lens system may be used as a ⅓ X relay lens in a laser thermal printer described in FIGS. 2 and 3. The lens system 200 comprises a plurality of lens elements arranged into two lens groups on either side of the aperture stop ST. The aperture stop ST is again located approximately at the center of the lens system 200. However, the shapes of the lens elements are quite different from those of the first embodiment. Following from the object side to the image side the lens elements are:

a positive meniscus lens element L1 with its convex surface oriented towards an aperture stop;

a biconvex lens element L2;

a meniscus doublet comprised of a meniscus negative lens element L3 and a meniscus positive lens element L4 followed by an aperture stop;

a cemented doublet following the aperture stop comprised of a positive lens element L5 and a negative lens element L6 cemented together; and a bi-convex singlet lens element L7 and a convex-plano singlet lens element L8.

Again, as in a preceeding embodiment, the surfaces facing the aperture stop of the components adjacent to the aperture stop are convex, thus forming a air space having a shape of a negative lens element at the aperture stop and the meniscus components of the two optical groups on either side of the aperture stop having their concave surfaces facing away from the aperture stop. The numerical data for the optical system of the second embodiment is as follows:

TABLE 2

| SURFACE | CLEAR APER. | RADIUS | THICK-NESS | GLASS |
|---|---|---|---|---|
| S1 | 8.35 | −10.7207 | 2.970 | 651559 |
| S2 | 9.42 | −7.32390 | 0.580 | |
| S3 | 8.87 | 18.1807 | 3.070 | 651559 |
| S4 | 8.22 | −18.1807 | 1.650 | |
| S5 | 7.65 | −5.62700 | 3.070 | 785258 |
| S6 | 9.41 | −96.0144 | 5.000 | 651559 |
| S7 | 10.75 | −8.52190 | 0.500 | |
| | 9.92 | DIAPHRAGM | 0.500 | |
| S8 | 9.76 | 11.9221 | 3.140 | 651559 |
| S9 | 8.92 | PLANO | 1.500 | 785258 |
| S10 | 7.88 | 6.67350 | 1.340 | |
| S11 | 8.13 | 18.1807 | 3.070 | 651559 |
| S12 | 8.33 | −18.1807 | 0.500 | |
| S13 | 7.97 | 5.91100 | 3.580 | 720504 |
| S14 | 6.40 | PLANO | 0.500 | |
| S15 | 5.61 | PLANO | 1.000 | 517642 |
| S16 | 4.72 | PLANO | | |
| | | LENS LENGTH | 31.970 | |

On the image side of the lens system, there is a 1 mm thick protective window, which can be easily cleaned. The focusing function is performed by moving an entire lens system.

Figure 5:
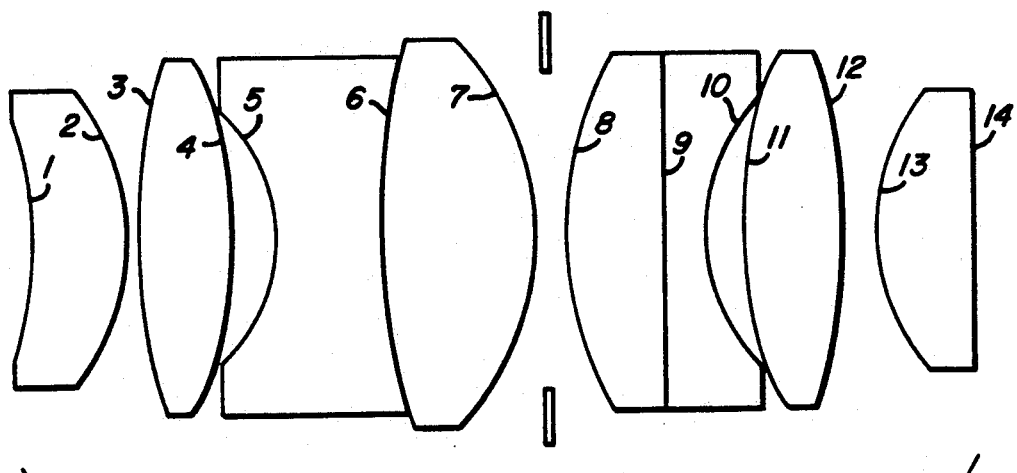
FIG. 5 is a profile drawing of an optical system of the third illustrative embodiment whose design is optimized for numerical apertures of 0.2 and 0.6.

The third embodiment is illustrated in FIG. 5. The lens system 300 of the third embodiment is designed for the wavelength range of 750 to 850 nm with the principal wavelength of 800 nm. The focusing function is performed by the movement of the rear-most lens element L8. The track length (i.e. the distance from the object to the image), nominally 2 inches or 50.8 mm will thus change by ±0.1 mm. Unlike the first two embodiments, this lens system does not use a protective window at the rear. The object diameter is 2.4 mm, while the image diameter is 0.8 mm, thus the optical system 300 has a magnification of ⅓. The numerical aperture at the object side is 0.2 and the numerical aperture at the image side is 0.6. The lens system 300 is comprised of 6 components in the following order from object to image:

A meniscus singlet lens element L1, a bi-convex singlet lens element L2, a doublet comprised of a bi-concave lens element L3 cemented to a bi-convex lens element L4, a doublet comprised of a convex-plano element L5 cemented to a plano-concave element L6, a bi-convex singlet L7 and a convex-plano singlet L8. The aperture stop ST is located between the third and the fourth components. The unusual feature of this lens system is that the sixth component can be varied in position, with respect to the preceeding components, by as much as ±/−0.1 mm, while the location of the image surface will stay nearly fixed with respect to the rear plano surface of the sixth component.

The nominal lens is slightly undercorrected (−0.015 mm) for lateral spherical aberration. Sagittal and tangential longitudinal astigmatic field are flat to less than 0.01 mm. Axial color is corrected to bring beams having wavelengths of 750 nm and 850 nm to a common focus position. Lateral color is corrected to less than 0.002 mm. Lateral tangential coma is corrected to less than 0.005 mm. Lateral distortion is corrected to less than 0.0001 mm. This data all applies at the image, i.e., on the short conjugate side of the lens.

The object consists of a linear array of 15 circular spots, each 0.1 mm in diameter, with center to center spacing of 0.15 mm. At ⅓ magnification, the images of the spots are 0.0333 mm in diameter. This is relatively coarse image structure. By comparing the size of the lateral aberrations to the size of the spots, it is clear that the lens is able to satisfactorily relay the images of these spots.

Because of the high numerical aperture of the beam at the image, the depth of focus according to the Rayleigh criterion is about +/−0.00111 mm, but because of the relatively coarse nature of the image structure, a more realistic tolerance for the depth of focus is about +/−0.01 mm, about 9 times larger than the Rayleigh depth. The numerical data for the lens system is as follows:

TABLE 3

| SURFACE | CLEAR APER. | RADIUS | THICK-NESS | GLASS |
|---|---|---|---|---|
| S1 | 7.31 | −11.7310 | 3.060 | 651559 |
| S2 | 8.35 | −7.21870 | 0.500 | |
| S3 | 8.06 | 24.8075 | 2.970 | 651559 |
| S4 | 7.61 | −15.0074 | 1.510 | |
| S5 | 7.19 | −5.20670 | 3.910 | 785258 |
| S6 | 9.77 | 42.2210 | 4.870 | 651559 |
| S7 | 11.03 | −8.23800 | 0.500 | |
| | 10.34 | DIAPHRAGM | 0.500 | |
| S8 | 10.14 | 10.9567 | 3.260 | 651559 |
| S9 | 9.21 | PLANO | 1.500 | 785258 |
| S10 | 7.97 | 6.38860 | 1.360 | |
| S11 | 8.23 | 15.0074 | 2.970 | 651559 |
| S12 | 8.33 | −24.8075 | 1.100 | |
| S13 | 7.94 | 6.19740 | 3.500 | 772497 |
| S14 | 6.40 | PLANO | | |
| | | LENS LENGTH | 31.510 | |

Figure 6:
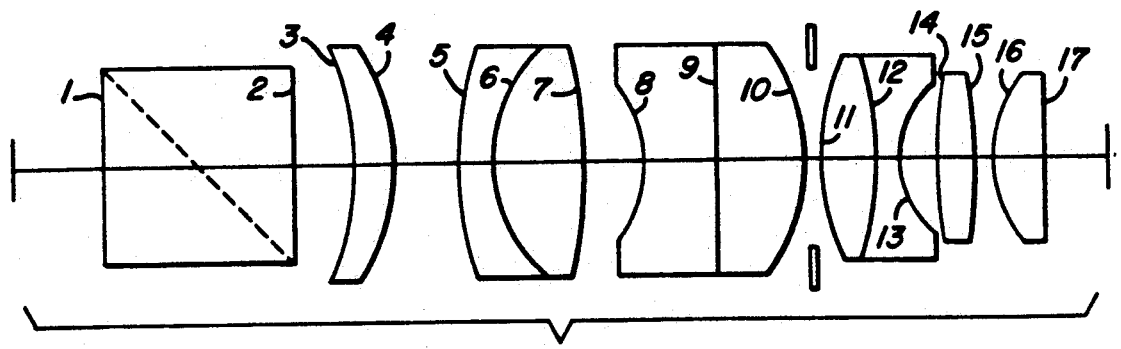
FIG. 6 is a profile drawing of an optical system of the fourth and fifth illustrative embodiments whose designs are optimized for numerical apertures of 0.253 and 0.55.

The fourth and the fifth illustrative embodiments are similar to each other and are illustrated in FIG. 6.

They are designed to have a track length of 70.7 m and 58.5 mm respectively. The object side numerical aperture is 0.253. The image side numerical aperture is 0.55. The ANSI f-number is 0.62 and magnification is 0.46 for both lens system designs.

Both lens systems are designed for 750-850 nm range and the lens comprises 6 lens components which are:
a first, positive meniscus lens element L1;
a bi-convex cemented doublet component comprised of
  a meniscus negative lens element L2 cemented to a bi-convex positive lens element L3;
a meniscus cemented doublet component comprising a
  concave-plano negative lens element L4 cemented to
  a plano-convex lens element L5, having a convex surface facing the aperture stop AS;
a meniscus cemented doublet component comprising a
  bi-convex lens element L6 cemented to a bi-concave lens element L7;
a positive bi-convex lens element L8; and
a convex-plano lens element L9.

The numerical parameters for the lens systems are given in tables 4 and 5 respectively.

TABLE 4

| SURFACE | CLEAR APER. | RADIUS | THICKNESS | GLASS |
|---|---|---|---|---|
| S1 | 6.92 | PLANO | 12.000 | 785258 |
| S2 | 10.65 | PLANO | 4.000 | |
| S3 | 12.40 | −21.6194 | 3.020 | 772497 |
| S4 | 13.39 | −11.1939 | 3.860 | |
| S5 | 13.01 | 24.0092 | 2.000 | 785258 |
| S6 | 12.11 | 9.35980 | 5.500 | 772497 |
| S7 | 11.36 | −32.6195 | 4.430 | |
| S8 | 8.62 | −6.61220 | 4.400 | 785258 |
| S9 | 10.81 | PLANO | 5.910 | 772497 |
| S10 | 12.29 | −10.9567 | 0.320 | |
| | 11.43 | DIAPHRAGM | 0.300 | |
| S11 | 11.25 | 14.0008 | 3.370 | 772497 |
| S12 | 10.47 | −34.0226 | 2.000 | 785258 |
| S13 | 8.76 | 7.07690 | 2.220 | |
| S14 | 9.21 | 32.7992 | 2.170 | 772497 |
| S15 | 9.39 | −32.7992 | 1.100 | |
| S16 | 9.34 | 7.29740 | 3.500 | 772497 |
| S17 | 8.12 | PLANO | | |
| | | LENS LENGTH | 60.100 | |

TABLE 5

| SURFACE | CLEAR APER. | RADIUS | THICKNESS | GLASS |
|---|---|---|---|---|
| S1 | 4.83 | PLANO | 8.000 | 517642 |
| S2 | 7.73 | PLANO | 4.000 | |
| S3 | 9.63 | −18.9706 | 3.360 | 772497 |
| S4 | 10.85 | −9.27810 | 1.240 | |
| S5 | 10.56 | 32.8590 | 2.000 | 785258 |
| S6 | 10.05 | 11.1065 | 4.790 | 772497 |
| S7 | 9.47 | −22.3953 | 4.380 | |
| S8 | 6.95 | −5.06210 | 3.000 | 785258 |
| S9 | 9.01 | 98.0453 | 5.060 | 772497 |
| S10 | 10.49 | −8.74010 | 0.550 | |
| | 9.80 | DIAPHRAGM | 0.420 | |
| S11 | 9.75 | 11.9576 | 3.690 | 772497 |
| S12 | 8.89 | −20.9492 | 2.000 | 785258 |
| S13 | 7.42 | 6.11100 | 1.870 | |
| S14 | 7.88 | 23.8064 | 2.680 | 772497 |
| S15 | 8.13 | −23.8064 | 1.100 | |
| S16 | 7.99 | 6.19740 | 3.500 | 772497 |
| S17 | 6.56 | PLANO | | |
| | | LENS LENGTH | 51.640 | |

I claim:

1. A finite conjugate lens system having high numerical apertures on both object and image sides, said lens system includes an aperture stop located approximately at the center of said lens system and a plurality of lens elements centered on an optical axis and arranged into two lens groups of positive power, said lens elements having sufficient powers, spacings and clear apertures to provide said high numerical apertures on both object and image sides of said lens system, each of said lens groups located to one side of said aperture stop, said lens groups each comprising an outer-most lens element and an inner-most lens element, said inner-most lens elements each located in close proximity to said aperture stop, and having a convex surface facing towards said aperture stop, wherein said high numerical apertures of the lens system are about 0.2 or higher.

2. A finite conjugate lens system according to claim 1, wherein said groups of lens elements each have an element with a concave surface facing away from said aperture stop.

3. A finite conjugate lens system according to claim 2, wherein said element with a concave surface is a second element from the aperture stop.

4. A finite conjugate lens system according to claim 1, wherein every positive lens element in said system has a convex surface facing the aperture stop.

5. A finite conjugate lens system according to claim 1, wherein said two lens groups are a front lens group and a rear lens group, said front lens group located in front of said aperture stop, said rear lens group located behind said aperture stop, said rear lens group comprising three lens components.

6. A finite conjugate lens system according to claim 5, wherein said three lens components comprise four lens elements.

7. A finite conjugate lens system according to claim 6, wherein one of said lens elements comprising said rear lens group is negative.

8. A finite conjugate lens system according to claim 1, wherein said two lens groups are a front lens group and a rear lens group, said front lens group located in front of said aperture stop, said rear lens group located behind said aperture stop, said front lens group comprising three lens components.

9. A finite conjugate lens system according to claim 5, wherein said front lens group comprises three lens components.

10. A finite conjugate lens system according to claim 9, wherein one of said three components of said front lens group includes one negative lens element.

11. A finite conjugate lens system according to claim 1 having numerical data substantially as set in the following table:

| SURFACE | CLEAR APER. | RADIUS | THICKNESS | GLASS |
|---|---|---|---|---|
| 1 | 8.41 | 38.6019 | 3.670 | 517642 |
| 2 | 8.82 | −7.29740 | 4.100 | |
| 3 | 6.83 | −4.31940 | 2.360 | 785258 |
| 4 | 8.94 | −8.54580 | 1.400 | |
| 5 | 10.12 | PLANO | 6.290 | 651559 |
| 6 | 11.36 | −10.7207 | 0.500 | |
| | 10.55 | DIAPHRAGM | 0.500 | |
| 7 | 10.44 | 17.0410 | 3.800 | 651559 |
| 8 | 9.87 | −12.0819 | 1.500 | 785258 |
| 9 | 9.09 | 9.22950 | 1.810 | |
| 10 | 9.57 | 42.9968 | 3.020 | 651559 |
| 11 | 10.01 | −14.6843 | 0.500 | |
| 12 | 9.74 | 6.77130 | 6.400 | 720504 |
| 13 | 5.98 | 15.7111 | 1.000 | |
| 14 | 5.14 | PLANO | 1.000 | 517642 |
| 15 | 4.44 | PLANO | | |
| | | LENS LENGTH | 37.850 | |

12. A finite conjugate lens system according to claim 1 having numerical data substantially as set in the following table:

| SURFACE | CLEAR APER. | RADIUS | THICKNESS | GLASS |
|---|---|---|---|---|
| 1 | 8.35 | −10.7207 | 2.970 | 651559 |
| 2 | 9.42 | −7.32390 | 0.580 | |
| 3 | 8.87 | 18.1807 | 3.070 | 651559 |
| 4 | 8.22 | −18.1807 | 1.650 | |
| 5 | 7.65 | −5.62700 | 3.070 | 785258 |
| 6 | 9.41 | −96.0144 | 5.000 | 651559 |
| 7 | 10.75 | −8.52190 | 0.500 | |
| | 9.92 | DIAPHRAGM | 0.500 | |
| 8 | 9.76 | 11.9221 | 3.140 | 651559 |
| 9 | 8.92 | PLANO | 1.500 | 785258 |
| 10 | 7.88 | 6.67350 | 1.340 | |
| 11 | 8.13 | 18.1807 | 3.070 | 651559 |
| 12 | 8.33 | −18.1807 | 0.500 | |
| 13 | 7.97 | 5.91100 | 3.580 | 720504 |
| 14 | 6.40 | PLANO | 0.500 | |
| 15 | 5.61 | PLANO | 1.000 | 517642 |
| 16 | 4.72 | PLANO | | |

| SURFACE | CLEAR APER. | RADIUS | THICKNESS | GLASS |
|---|---|---|---|---|
| | | LENS LENGTH | 31.970 | |

13. A finite conjugate lens system according to claim 1 having numerical data substantially as set in the following table:

| SURFACE | CLEAR APER. | RADIUS | THICKNESS | GLASS |
|---|---|---|---|---|
| 1 | 7.31 | −11.7310 | 3.060 | 651559 |
| 2 | 8.35 | −7.21870 | 0.500 | |
| 3 | 8.06 | 24.8075 | 2.970 | 651559 |
| 4 | 7.61 | −15.0074 | 1.510 | |
| 5 | 7.19 | −5.20670 | 3.910 | 785258 |
| 6 | 9.77 | 42.2210 | 4.870 | 651559 |
| 7 | 11.03 | −8.23800 | 0.500 | |
| | 10.34 | DIAPHRAGM | 0.500 | |
| 8 | 10.14 | 10.9567 | 3.260 | 651559 |
| 9 | 9.21 | PLANO | 1.500 | 785258 |
| 10 | 7.97 | 6.38860 | 1.360 | |
| 11 | 8.23 | 15.0074 | 2.970 | 651559 |
| 12 | 8.33 | −24.8075 | 1.100 | |
| 13 | 7.94 | 6.19740 | 3.500 | 772497 |
| 14 | 6.40 | PLANO | | |
| | | LENS LENGTH | 31.510 | |

14. A finite conjugate lens system according to claim 1 having numerical data substantially as set in the following table:

| SURFACE | CLEAR APER. | RADIUS | THICKNESS | GLASS |
|---|---|---|---|---|
| 1 | 6.92 | PLANO | 12.000 | 785258 |
| 2 | 10.65 | PLANO | 4.000 | |
| 3 | 12.40 | −21.6194 | 3.020 | 772497 |
| 4 | 13.39 | −11.1939 | 3.860 | |
| 5 | 13.01 | 24.0092 | 2.000 | 785258 |
| 6 | 12.11 | 9.35980 | 5.500 | 772497 |
| 7 | 11.36 | −32.6195 | 4.430 | |
| 8 | 8.62 | −6.61220 | 4.400 | 785258 |
| 9 | 10.81 | PLANO | 5.910 | 772497 |
| 10 | 12.29 | −10.9567 | 0.320 | |
| | 11.43 | DIAPHRAGM | 0.300 | |
| 11 | 11.25 | 14.0008 | 3.370 | 772497 |
| 12 | 10.47 | −34.0226 | 2.000 | 785258 |
| 13 | 8.76 | 7.07690 | 2.220 | |
| 14 | 9.21 | 32.7992 | 2.170 | 772497 |
| 15 | 9.39 | −32.7992 | 1.100 | |
| 16 | 9.34 | 7.29740 | 3.500 | 772497 |
| 17 | 8.12 | PLANO | | |
| | | LENS LENGTH | 60.100 | |

15. A finite conjugate lens system according to claim 1 having numerical data substantially as set in the following table:

| SURFACE | CLEAR APER. | RADIUS | THICKNESS | GLASS |
|---|---|---|---|---|
| 1 | 4.83 | PLANO | 8.000 | 517642 |
| 2 | 7.73 | PLANO | 4.000 | |
| 3 | 9.63 | −18.9706 | 3.360 | 772497 |
| 4 | 10.85 | −9.27810 | 1.240 | |
| 5 | 10.56 | 32.8590 | 2.000 | 785258 |
| 6 | 10.05 | 11.1065 | 4.790 | 772497 |
| 7 | 9.47 | −22.3953 | 4.380 | |
| 8 | 6.95 | −5.06210 | 3.000 | 785258 |
| 9 | 9.01 | 98.0453 | 5.060 | 772497 |
| 10 | 10.49 | −8.74010 | 0.550 | |
| | 9.80 | DIAPHRAGM | 0.420 | |
| 11 | 9.75 | 11.9576 | 3.690 | 772497 |
| 12 | 8.89 | −20.9492 | 2.000 | 785258 |
| 13 | 7.42 | 6.11100 | 1.870 | |
| 14 | 7.88 | 23.8064 | 2.680 | 772497 |
| 15 | 8.13 | −23.8064 | 1.100 | |
| 16 | 7.99 | 6.19740 | 3.500 | 772497 |
| 17 | 6.56 | PLANO | | |
| | | LENS LENGTH | 51.640 | |

16. A finite conjugate lens system having high numerical apertures on both object and image sides comprising an aperture stop located approximately at the center of said high aperture lens system and a plurality of lens elements centered on an optical axis and arranged into two lens groups of positive power, said lens elements having sufficient powers, spacings and clear apertures to provide said high numerical apertures of at least 0.2 on both object and image sides of said lens system, each of said lens groups located to one side of said aperture stop, said lens groups each comprising an outer-most lens element and an inner-most lens element, said inner-most lens elements each located in close proximity to said aperture stop, and having a convex surface facing towards said aperture stop,
wherein said lens groups comprise three lens components each, wherein one of said lens groups comprises four lens elements.

17. A finite conjugate lens system according to claim 16, wherein one of said lens elements comprising said rear lens group is negative.

18. A finite conjugate lens system having high numerical apertures of at least 0.2 on both object and image sides and said system includes an aperture stop located approximately at the center of said lens system and a plurality of lens elements centered on an optical axis and arranged into two lens groups of positive power, said lens elements having sufficient powers, spacings and clear apertures to provide said high numerical apertures on both object and image sides of said lens system, said lens groups located on each side of said aperture stop, said lens groups each comprising an outer-most lens element and an inner-most lens element, said inner-most lens elements each located in close proximity to said aperture stop, and having convex surface facing towards said aperture stop.

19. A finite conjugate lens system according to claim 18, wherein said groups of lens elements each have an element with a concave surface facing away from said aperture stop.

20. A finite conjugate lens system according to claim 19, wherein said element with a concave surface is a second element from the aperture stop.

* * * * *